United States Patent [19]
Jenkins

[11] Patent Number: 4,911,510
[45] Date of Patent: Mar. 27, 1990

[54] CORNER GUIDE

[75] Inventor: Peter D. Jenkins, Woodbridge, England

[73] Assignee: British Telecommunications plc, Great Britain

[21] Appl. No.: 348,590

[22] PCT Filed: Aug. 26, 1988

[86] PCT No.: PCT/GB88/00712
§ 371 Date: Apr. 25, 1989
§ 102(e) Date: Apr. 25, 1989

[87] PCT Pub. No.: WO89/02180
PCT Pub. Date: Mar. 9, 1989

[30] Foreign Application Priority Data
Aug. 26, 1987 [GB] United Kingdom ............... 8720103

[51] Int. Cl.$^4$ ............................................. G02B 6/44
[52] U.S. Cl. ................................. 350/96.10; 49/167; 174/86; 350/96.23; 439/31
[58] Field of Search ............... 350/96.10, 96.15, 96.16, 350/96.20, 96.23, 96.29; 174/86; 439/31; 49/167

[56] References Cited
U.S. PATENT DOCUMENTS
4,412,711 11/1983 Suska ................................ 439/31

FOREIGN PATENT DOCUMENTS
DE-A-
3116869 11/1982 Fed. Rep. of Germany .
3116869 11/1982 Fed. Rep. of Germany .
57-81203 5/1982 Japan .

OTHER PUBLICATIONS
Patent Abstracts of Japan, vol. 6, No. 162 (P-137)[1040] Aug. 25, 1982; & JP-A-57 81 203 (Nippon Denshin Denwa Kosha) 05-21-1982, (and English translation of same).
Review of the Electrical Communication Laboratories, vol. 22, No. 4, 1984, "Design and Performance of Optical Drop and Indoor Cables" by Kukita et al.-pp. 636-645.
Thomas, "Cabling to Hinged Electrical Assemblies", Electronic Production, May-Jun. 1964, p. 25.

Primary Examiner—John D. Lee
Attorney, Agent, or Firm—Nixon & Vanderhye

[57] ABSTRACT

A corner guide comprises a pair of hinged panels (1, 2) with an embedded duct (6) through which an optical fibre (7) can be threaded. The corner guide, for guiding an optical fibre (7) or the like around a corner (9) whose radius of curvature is less than a permissible minimum radius of curvature Rp for the fibre (7), guides the fibers (7) by means of the duct (6) along a path which extends into three dimensions. At the corner at the hinge between the panels (1, 2), the duct (6) passes through an "x-y" plane containing the corner at an angle for instance of 70°. This enables an arrangement wherein the projection of the duct (6) onto the "x-y" plane includes a bend whose radius of curvature is less than Rp although the path itself does not include such a bend. The invention finds particular application in optical fibre installations in homes or offices, wherever a fibre has to turn a corner, for instance at the corner of a room. Alternatively it finds application in equipment served by optical fibers which include for instance a hinged panel to which the fibers must extend.

15 Claims, 4 Drawing Sheets

CORNER GUIDE

The present invention relates to a corner guide which can be used in guiding a flexible longitudinal element, which has a minimum permissible bend radius, around a corner. The invention finds particular application in optical fibre installations.

It is sometimes necessary to guide an element of the above type around a corner in circumstances where space is limited. For instance, at least part of an optical communications system may have to be installed in a domestic or office environment. Conveniently optical fibres forming part of such a system may be laid around the edge of a room at floor level, for instance just above the skirting board. Almost inevitably in many cases, they will then have to follow round a corner of the room. This can give rise to a problem because an optical fibre typically has a minimum permissible bend radius of the order of 25 to 30 mm to avoid fibre damage and/or significant optical losses. Optical fibre bundles may have even greater minimum bend radii, for instance 50 mm or more. Even single optical fibres cannot therefore be bent directly through a right angle to follow the corner of a room.

In another example, optical fibres might be used to make connections between a hinged panel and a piece of associated equipment, for instance in an optical racking system. The fibre or fibres may then have to accommodate a changing angle between the panel and the equipment.

In the past a former unit having the minimum permissible radius of curvature has been used so that an optical fibre or an optical fibre containing cable is simply bent round a corner at that minimum radius. The use of such a former unit however means that the fibre or cable does not fit right into an angular corner and such corners have to be "rounded off". This leads to corner installations protruding into the room.

In Japanese patent application 57-81203 there is disclosed a corner protector for indoor optical leads, the protector comprising a conduit having a pair of arms linked by an almost 180° bend, the bend lying in a single plane. The arms of the protector are themselves bent about their mid points, so their straight distal ends remote from the near 180° bend are in a common plane one with the other, but are disposed orthogonally. When the protector is installed the distal end of one arm is secured to a surface on one side of the corner, the distal end of the second arm is secured to a surface on the other side of the corner with the near 180° bend positioned at the corner with the tangent to its apex orthogonal to the line of the corner. The near 180° bend and the bends in the two arms are each of a radius no less than the fibre's minimum bend radius, satisfying the minimum bend radius requirement. By making the bore of the conduit sufficiently large, it is possible to make a corner protector which fits tight to the corner, although of course the conduit itself stands proud of the wall/-corner surface. Indeed it is the degree to which the outer surface of the conduit must protrude from the surface to which the conduit is mounted that constitutes one of the more significant disadvantages of the Japanese arrangement. It should also be noted, however, that unlike the present invention, the Japanese arrangement is not suitable for use where there is movement such that the angle of the corner varies, as it does at a hinge.

The present invention has for its general object to alleviate or to overcome disadvantages related to prior art devices. A particular object of the invention is to guide a longitudinal element, for instance an optical fibre or an optical fibre containing cable, around a corner in a convenient manner, without bending the element at less than a permissible minimum radius of curvature or subjecting it to a significant degree of torsion.

The present invention provides a corner guide for guiding a longitudinal element to follow a corner, which guide comprises a support member for supporting the element, and guide means for guiding an element supported by the support member to extend along a substantially predetermined path along the support member which path has a directional component perpendicular to the plane of the corner, at the corner, so that a projection of the path onto the plane includes a bend with a radius of curvature less than the permissible minimum radius of curvature, whereas the path itself does not include a bend having such a radius of curvature.

The angle between the path and the plane, where the path intersects the plane, may vary depending on the circumstances. That is, if the corner has a radius of curvature not much less than the permissible minimum radius of curvature for the element, then the path may meet the plane at an angle of the order of 20° for instance. However, if the corner has a radius of curvature which is substantially less than that permissible for the element, and additionally it is important that the element does not tend to protrude from or round off the corner to any significant extent, then it might be necessary that the path meets the plane at an angle of the order of 70°, or approaching 90°, or even at 90°.

It has been found that corner guides according to embodiments of the present invention can be used to guide an optical fibre around a corner, for instance the corner of a room, without introducing either too sharp a bend in the optical fibre, or significant torsion. Such corner guides can also be designed for use with hinged or folding elements, an optical fibre being guided from one to the other, without significant torsion being introduced even when the elements are moved from a folded or closed position to an unfolded or open position.

Even where a corner guide is to be used to guide an optical fibre between hinged or folding elements, it has been found that the guide means may guide the fibre along a path which is predetermined with respect to each element except for a relatively short distance in the region of the hinge(s) or fold. Over this short distance, of the order of 5 cm total, a little play may be required to allow the fibre to a take up a slightly different radius of curvature near the hinge or fold depending on whether the elements are in a closed or open position.

The support member may itself conveniently comprise hinged or folding members so that it can be brought into either an installed position in which the hinged or folding members mirror the corner concerned, or a storage position in which the members are either brought together or opened out flat. The hinged or folding members may for instance comprise a pair of panels. Alternatively they may be provided by parts of an optical racking, or other optical equipment, system.

Particularly where an optical fibre is to be installed around a corner for a relatively long time, such as more than six months or a year, it is preferable that the guide means should comprise releasable retaining means for the optical fibre. The fibre can then be installed, when the corner guide is already configured to follow the corner, in a manner which allows any torsion which might otherwise appear to be either avoided or substantially dissipated. By installing the fibre into releasable retaining means progressively, starting at one end with respect to the corner guide, torsion can be avoided by rotation of a remaining free end of the fibre. Alternatively it can be dissipated along a considerable length of fibre, leading away from the corner guide, instead of being confined to the length of fibre installed in the corner guide.

In a preferred embodiment of the present invention, the guide means comprise a duct into which the longitudinal element can be fed from one end. This is particularly useful where the element comprises an optical fibre because the act of feeding the element through the duct, even though the corner guide might already be configured to follow the corner, tends to distribute any torsion into the full length of the element rather than just the length installed in the corner guide. Where the support member comprises a pair of hinged or folding panels, the duct may be mounted on or embedded in the panels, or indeed may be simply a groove in the panels.

A corner guide according to an embodiment of the present invention has—compared with a known former unit—an increased depth to accommodate the part of the path which has a directional component perpendicular to the plane of the corner. However it may also have considerably reduced or virtually no thickness so that it avoids protrusion from a corner, for instance into a room. The corner guide need only have a thickness marginally greater than the width of the fibre package to be guided, and hence can be appreciably less intrusive than prior art guides. The outline may then be for example substantially a right angle which will fit neatly into the right-angled corner of a room whereas the element itself never has to go through a right angle.

The invention can be used for example where an optical fibre cable extends to a domestic telephone instrument or broadband services unit (tv, banking, etc). The cable does not protrude into the room, and the corners of a living room do not have to be rounded off. The optical fibre cable fits neatly above, for example, a skirting board.

The design of a corner guide can be selected to suit its position, and the decor, in a room and can be decorated after fixing. A corner guide could be manufactured for instance by injection moulding, with perhaps a wood grain finish, so as to blend with further domestic decoration, perhaps being moulded as a skirting board.

Corner guides according to preferred embodiments of the invention will now be described, by way of example only, with reference to the accompanying Figures in which.

Figure 1:
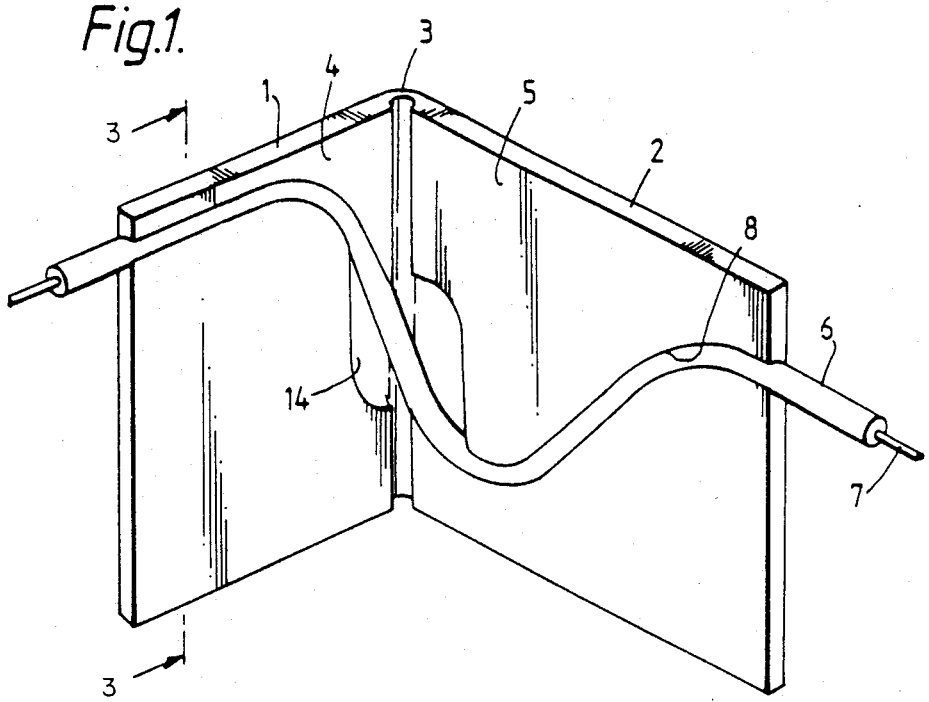
FIG. 1 shows a perspective view of a corner guide according to a first embodiment of the present invention, in use to guide an optical fibre cable at the corner of a room.

Referring to FIG. 1, a corner guide according to an embodiment of the present invention comprises a pair of rectangular panels 1, 2 hinged together at one each of their respective edges by means of a flexible strip 3. The panels 1, 2 are arranged at right angles to each other and on the inner pair of faces 4,5 with respect to the right angle between the panels 1,2 there is mounted a curved duct 6 although this may be dispensed with where the optical fibre is suitably packaged. A cable 7 containing an optical fibre extends through the duct 6.

The panels 1,2 and strip 3 are integral, the strip 3 comprising a thinner portion of the same material providing the panels 1,2. A suitable material for an integrally hinged unit is polypropylene. Other forms of hinge could of course replace the strip 3 and the panels 1,2 could be separate entities coupled by the hinge.

Figure 2:
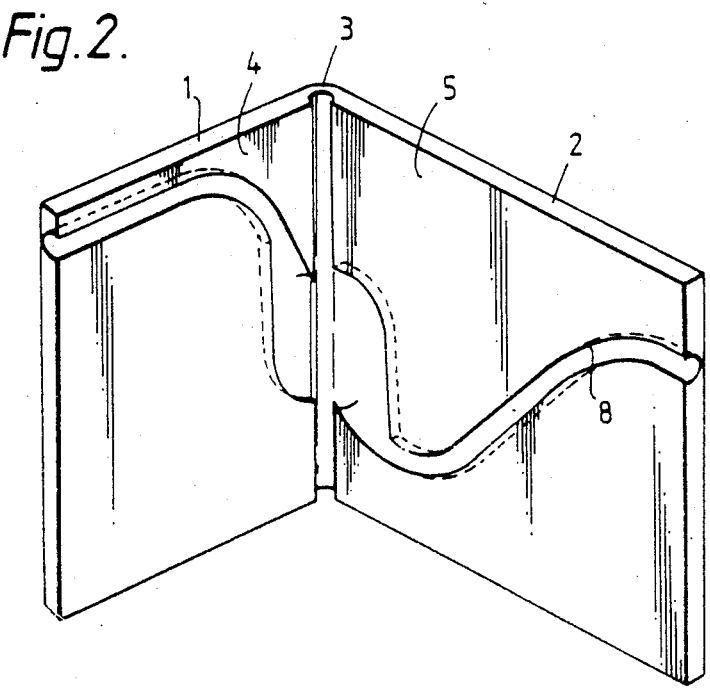
FIG. 2 shows the guide of FIG. 1 in the absence of the cable.

The duct 6 is mounted on the panels 1,2 by means of a curved groove 8. Referring to FIGS. 1 and 2, the groove 8 runs across the inner pair of faces 4,5, along the path it is intended the optical fibre cable 7 should follow when installed in the corner guide.

Figure 3:
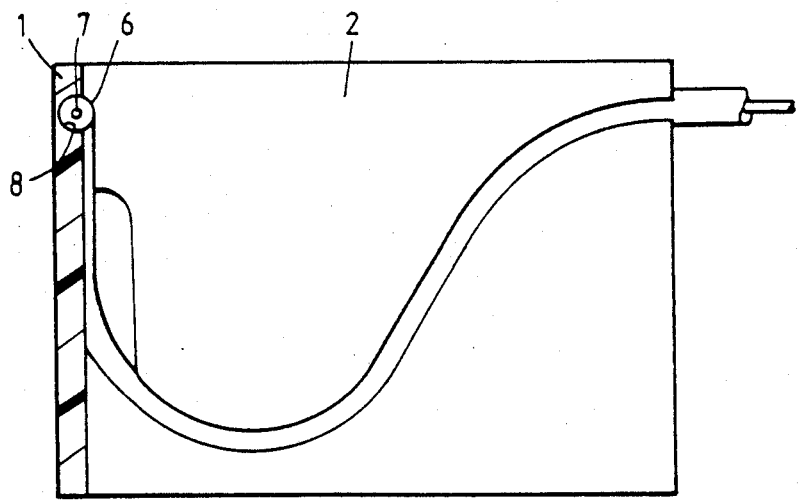
FIG. 3 shows a cross section taken along the line AA in FIG. 1, viewed in the direction indicated by the arrows.

Referring to FIG. 3, the duct 6 is held in the groove 8 by a snap fit action, the cross section of the groove 8 being slightly narrowed at the opening so as to retain the duct 6.

The material of the duct 6 is not important but it should preferably be flexible and capable of protecting the cable 7 if necessary. It should also preferably comprise a material that will not tend to generate or attract contaminants or oxidation to the optical fibre environment in use. For instance, it could be constructed as a tube of inner diameter 1.5 mm and outer diameter 2.5 mm, out of polyethylene, for use with a secondary coated optical fibre as the cable 7. Such fibres typically may have an outer diameter of 1.0 mm.

Figure 4:
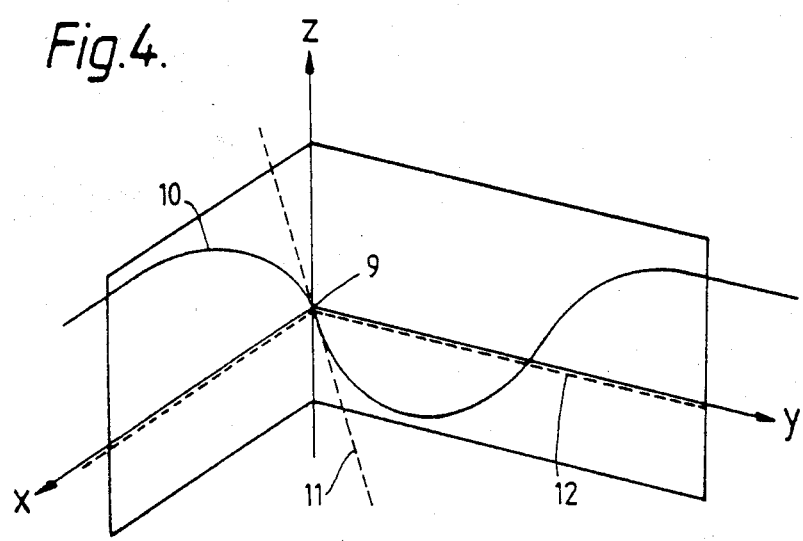
FIG. 4 shows a schematic representation of the guide of FIG. 1.

Referring to FIG. 4, the purpose of the corner guide is to provide means to guide the optical fibre cable 7 so as to follow a right angle corner 9 in an "x-y" plane. It is achieved by guiding the cable 7 along a path 10 which has a directional component in the "z" direction, perpendicular to that plane, at the corner 9. The angle between the tangent 11 to the path 10 at the corner 9, and the "x-y" plane is 70°.

Because the angle between the tangent 11 and the "x-y" plane is less than 90°, it is inevitable that the projection 12 of the path 10 on the "x-y" plane does not show a perfect right angle at the corner 9. However, only a relatively slight "rounding off" is produced, the radius of curvature of the projection 12 at the corner 9 being of the order of only 5 mm.

In an alternative embodiment, the panels of the device are 70 mm high, 6 mm thick, with a groove 5 mm wide and 5 mm deep, the angle between the tangent and the "x-y" plane is between 80° and 90°, typically 85°, and the radius of curvature of the projection 12 at the corner 9 is of the order of only 2–3 mm.

Figure 5:
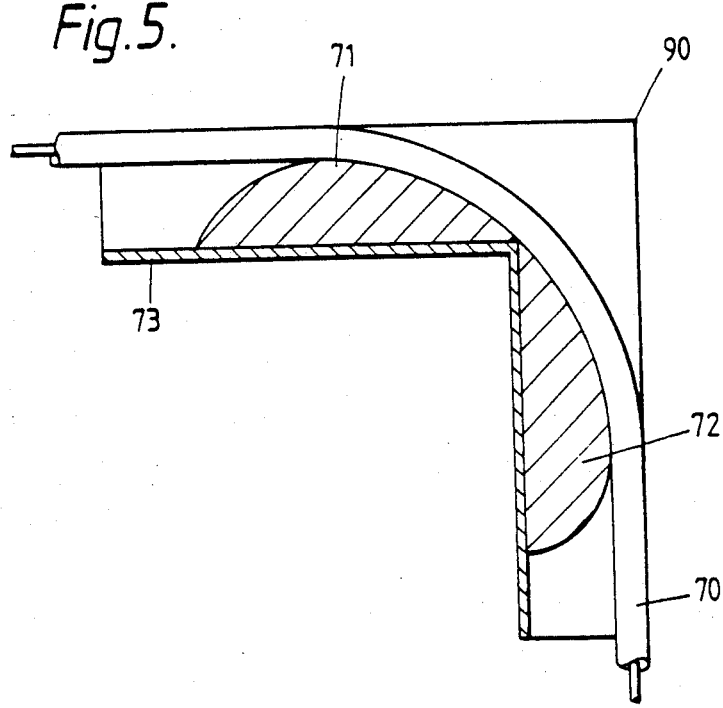
FIG. 5 shows a cross section of a former unit according to the prior art.

Referring to FIG. 5, a former unit of the prior art comprises two curved guides 71, 72 mounted on a support 73. A fibre cable 70 is simply wrapped around the curved outer surfaces of the guides 71, 72 at a corner 90. Necessarily the radius of curvature of the curved surfaces must be at least, for example, 30 mm, in order to preserve the permissible minimum bend radius of the fibre cable 70.

To compare the corner guide according to an embodiment of the present invention as described above, with a former unit as shown in FIG. 5, then the closest distance at which an installed fibre cable having permissible minimum bend radius 30 mm, will approach the corner will be about 2 mm in the case of the corner guide, and about 12 mm in the case of the former unit. It will be appreciated that a corner guide can therefore be designed which is substantially less obtrusive than a former unit. If an optical fibre bundle is to be guided round a corner, having a permissible minimum bend radius of 50 mm or more, the advantage given by embodiments of the present invention is even greater.

Figure 6:
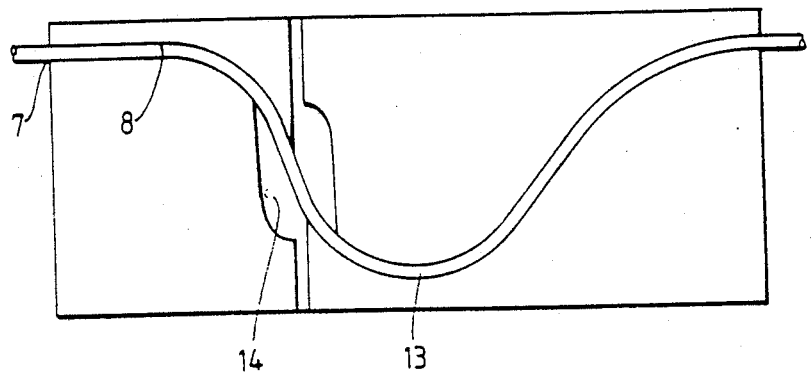
FIG. 6 shows the guide of FIG. 2 opened out to lie flat.

Because the permissible minimum radius of curvature of the optical fibre cable 7 is 30 mm, there is no part of the path 10 which shows a lower radius of curvature. Referring to FIG. 6, if the panels 1,2 are opened out so that the groove 8 lies in a single plane, it can be seen that the groove follows an open-sided loop 13, away from the level of a cable 7 incoming to the corner guide and back to the same level again at the point where a cable exits from the guide. Even when the panels 1, 2 are configured at right angles to each other as shown in FIG. 1, the minimum bend radius of the path 10 itself, in any plane, occurs at the loop 13 and is 30 mm.

Figure 7:
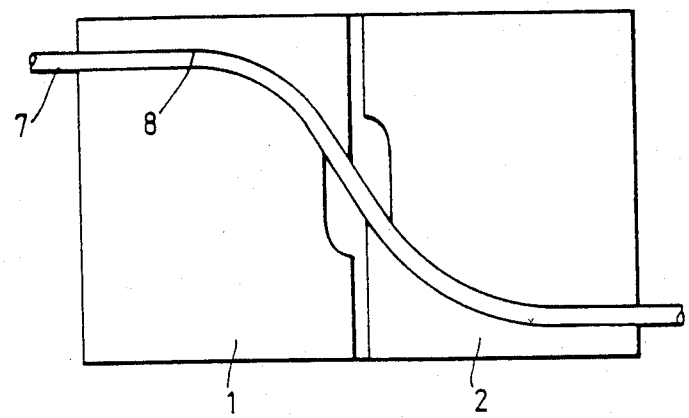
FIG. 7 shows a corner guide according to a second embodiment of the present invention, opened out to lie flat.

It may be necessary that the cable 7 should exit from the corner guide at the same level as it comes in to the corner guide. However, referring to FIG. 7, the two supporting panels 1, 2 might for instance alternatively be identical to each other except that one panel 2 is rotated through 180° with respect to the other.

It will be recognised that corner guides as described above have more depth, in order to accommodate the loop 13, than an equivalent former unit according to the prior art. However there are many applications, for instance in installing optical fibre cables above a skirting board, where such depth is not a problem whereas "rounding off" a corner, or protruding into a room at a corner, would be a problem.

Figure 8:
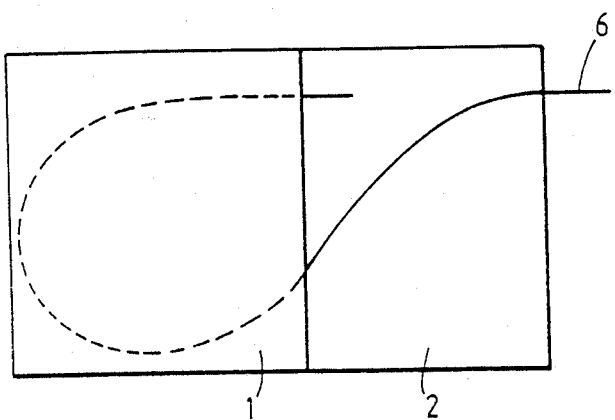
FIG. 8 shows a schematic representation of the corner guide of FIG. 2, folded flat for storage.

Referring to FIG. 8, a corner guide as described above may be capable of being folded flat at the strip 3, between the panels 1, 2, for storage purposes. In this case, the duct 6 will become a flat loop. Under these circumstances however, the tangent to the duct 6 at the strip 3 will run parallel to the length of the strip 3. Because the position of the duct 6 relative to the strip 3 varies between the cases where the panels 1, 2 are at 90° in a working positon, and fold flat for storage, it is necessary to design the groove 8 to allow play between the duct 6 and the groove 8 in the vicinity of the strip 3. Referring to FIGS. 1 and 6, this is done by opening out the groove 8 in the vicinity of the strip 3 so that the duct 6 lies across what is effectively an open depression 14. The depression 14 extends about 30 mm in a direction parallel to the strip 3 and about 15 mm in a direction perpendicular to the strip 3.

In a method of mounting an optical fibre cable 7 in a corner guide as described above, a free end of the cable may be inserted into the duct 6 from one end, the panels 1,2 being either opened out flat into a common plane, or already at an angle to each other in an installed configuration. In this case, any torsion introduced as the cable is fed along the duct is likely to be eliminated by rotation of the free end of the cable 7. If this is not the case, and torsion remains just in the length of cable installed in the corner guide when the corner guide is in an installed configuration, then by pulling the cable further through the duct that torsion can be "fed through". That is, it will pass into the full length of cable leading away from the corner guide and, at least effectively, be dissipated.

In an alternative mounting method, instead of the duct being already mounted on or in the corner unit, it could be slid into position as a sleeve at the appropriate part of the cable, the cable and duct then being mounted together on the corner guide. If the cable and duct are mounted progressively, from one end with respect to the corner guide, it should be a fairly simply matter to avoid significant torsion being introduced. Again, as above, any remaining torsion might be dissipated by pulling the cable further through the duct after installation on the corner guide so as to "feed through" torsion to the full length of cable rather than just that at the corner guide.

Optical fibres can be supplied for use in optical communications systems in various ways. In particular the number and quality of protective coverings associated with one fibre, or a plurality of fibres, can vary substantially. In an alternative arrangement, if the protective covering of a fibre or fibres is sufficient, the duct 6 can be dispensed with altogether and the covered fibre or fibres fed or laid directly into the groove 8. Alternatively the fibre or fibres may be clipped (again progressively) into the groove 8.

In another alternative arrangement, the duct 6 and groove 8 might both be dispensed with and an alternative guide means used such as individual clips and/or guide pins.

In a further alternative arrangement, the duct 6 itself might be designed to be sufficiently rigid to act as both support member and guide means, the panels 1, 2 being dispensed with.

It is not necessary, merely preferable, that the corner guide should be designed to be adjustable with regard to the angle through which a longitudinal element might be guided. The hinge provided by the flexible strip 3 might be useful for storage, and also flexibility in application of the corner guide.

In another alternative arrangement, the duct 6 and groove 8 might both be dispensed with and an alternative guide means used such as individual clips and/or guide pins.

In a further alternative arrangement, the duct 6 itself might be designed to be sufficiently rigid to act as both support member and guide means, the panels 1, 2 being dispensed with.

It is not necessary, merely preferable, that the corner guide should be designed to be adjustable with regard to the angle through which a longitudinal element might be guided. Although the hinge provided by the flexible strip 3 might be useful for storage, and also flexibility in application of the corner guide, it could be dispensed with and the guide have a single, dedicated position.

Although as described above, particularly for instance with reference to FIG. 2, the duct and cable run on the inside of the corner guide, they could alternatively be mounted on the outside surfaces. This might be preferable for mounting in the corner of a room since a smooth surface of the corner guide would be presented to the room.

A cover might also or alternatively be provided to protect and hide the duct and cable. Such a cover might for instance be provided with a sliding dovetail mount co-operating with retaining means on the corner guide. A cover could also conceal retaining screws or the like, used to mount the corner guide in position in a room.

A corner guide according to an embodiment of the present invention could be used to guide multiple longitudinal elements. For instance it could be used to guide a ribbon cable comprising optical fibres. In such a case however, the single elements of the ribbon cable would need to be separated to follow a curved path through the corner guide. Further, it is likely a plurality of grooves 8 would need to be provided to retain each of the single elements.

I claim:

1. A corner guide for use in guiding a longitudinal element to follow a corner, which guide comprises a support member for supporting the element, and guide means for guiding the element, when supported by the support member, to extend along a substantially predetermined path along the support member which path has a directional component perpendicular to the plane of the corner, at the corner, so that a projection of the path onto the plane includes a bend with a radius of curvature less than the permissible minimum radius of curvature of the element whereas the path itself does not include a bend having such a radius of curvature.

2. A corner guide according to claim 1 wherein the angle between the tangent to the path at the corner, and the plane, lies in the range from 15° to 90° inclusive.

3. A corner guide according to claim 2 wherein the angle between the tangent to the path at the corner, and the plane, is of the order of 70°.

4. A corner guide according to claim 1 wherein the element comprises an optical fibre.

5. A corner guide according to claim 1 wherein the element comprises a bundle of optical fibres.

6. A corner guide according to claim 1 wherein the guide means comprises releasable retaining means for the element.

7. A corner guide according to claim 1 wherein the guide means comprises a duct mounted on or embedded in the support member.

8. A corner guide according to claim 1 wherein the support member and the guide means are integral.

9. A corner guide according to claim 1 wherein the guide means comprises a groove in a surface of the support member.

10. A corner guide according to claim 1, wherein the support member comprises a pair of panels hinged together so that they can be brought into either one of a position conforming to the shape of the corner, and a flat position suitable for storage.

11. A corner guide, according to claim 1, wherein a flexible longitudinal element comprising an optical fibre is guided by the corner guide to follow a corner.

12. A corner guide for a longitudinal element comprising a support member and guide means, the guide means guiding the element along a path which extends into three dimensions such that the element is guided through a corner at an angle A of more than 0° to the plane containing the corner, the element thus being guided to follow a corner whose minimum radius of curvature, Rc, is less than the minimum radius of curvature of the element Re.

13. A corner guide according to claim 12 wherein Rc is less than a permissible minimum radius of curvature for the element concerned.

14. A corner guide according to claim 12 wherein the angle A lies in the range from 15° to 90° inclusive.

15. A corner guide according to claim 14 wherein the angle A is of the order of 70°.

* * * * *